(12) United States Patent
Shiraishi

(10) Patent No.: US 7,483,725 B2
(45) Date of Patent: Jan. 27, 2009

(54) MOBILE TELEPHONE

(75) Inventor: Mitsutaka Shiraishi, Saitama (JP)

(73) Assignee: NEC Corporation, Tokyo (JP)

( * ) Notice: Subject to any disclaimer, the term of this patent is extended or adjusted under 35 U.S.C. 154(b) by 448 days.

(21) Appl. No.: 10/973,394

(22) Filed: Oct. 27, 2004

(65) Prior Publication Data

US 2005/0096107 A1    May 5, 2005

(30) Foreign Application Priority Data

Oct. 30, 2003    (JP)  ............................ 2003-370936

(51) Int. Cl.
*H04B 1/38*    (2006.01)
(52) U.S. Cl. .............. 455/575.3; 455/575.1; 455/575.4; 455/90.3
(58) Field of Classification Search .............. 455/575.1, 455/575.3, 575.4, 575.6, 575.8, 90.3
See application file for complete search history.

(56) References Cited

U.S. PATENT DOCUMENTS

| | | | | |
|---|---|---|---|---|
| 6,091,830 | A  * | 7/2000 | Toki ........................... | 381/359 |
| 6,137,883 | A  * | 10/2000 | Kaschke et al. ........ | 379/433.07 |
| 6,389,297 | B1 | 5/2002 | Attimont et al. | |

FOREIGN PATENT DOCUMENTS

| | | |
|---|---|---|
| JP | 7-131849 | 5/1995 |
| JP | 8-097895 | 4/1996 |
| JP | 8-111704 | 4/1996 |
| JP | 9-135286 | 5/1997 |
| JP | 2000-307700 A | 11/2000 |
| JP | 2003-152841 A | 5/2003 |
| WO | WO 00/70843 | 11/2000 |
| WO | WO 2004/105362 A1 | 12/2004 |

OTHER PUBLICATIONS

Patent Abstracts of Japan, vol. 2000, No. 14, Mar. 5, 2001, "Portable Radio Telephone Set," abstract only.

* cited by examiner

*Primary Examiner*—Tuan A Pham
(74) *Attorney, Agent, or Firm*—Foley & Lardner LLP

(57) ABSTRACT

In recent years, a design where a microphone is not located in a position appropriately facing the oral cavity of an operator has been widely adopted from a viewpoint of convenience of miniaturization and mounting of a mobile telephone. When telephonic communication is made with such a mobile telephone, if a voice of the other party for telephonic communication is hard to hear, the operator necessarily tightly presses his/her face against a front surface of a chassis. Thus, the sensitivity and sound collecting property of the microphone are reduced. In the present invention, when a sound hole as a voice transmission path is formed in the vicinity of a manipulation section, slits are formed in the peripheries of the manipulation section and the sound hole. Hence, even in a situation in which an operator necessarily tightly presses his/her face against a front surface of a chassis, the voice transmission path is ensured to a certain extent, and thus the sound collecting property is ensured to some degree or more.

2 Claims, 5 Drawing Sheets

MOBILE TELEPHONE

BACKGROUND OF THE INVENTION

1. Field of the Invention

The present invention relates to a mobile telephone, and more particularly to leading tone structure of a mobile telephone.

2. Description of the Related Art

The total number of parties to contracts of a mobile telephone and a personal handyphone system (PHS) exceeds 82 millions of people in Japan (at a time point of the end of June, 2003). Thus, the mobile telephone and the PHS have become items which are generally possessed.

Each of those electronic apparatuses has a telephonic communication function as a main function. Thus, in those electronic apparatuses, the quality of a loudspeaker for reproducing incoming audio data becomes important. As a matter of course, it is required for the loudspeaker to allow reproduction of incoming audio data at tone quality of high grade. In addition thereto, since the chord performance of a embedded sound source chip has been enhanced, more sophisticated expression has been required for notification of an incoming call as one of use applications of a conventional loudspeaker. In addition, in recent years, voices, songs, and the like have also been used as lingua for incoming calls, and hence the demand for enhancement of the tone quality has more and more increased.

Here, when the mobile telephone is normally designed, there are two kinds of ideas, i.e., an idea of determining a position of a loudspeaker so as to correspond to the ear of an operator, and an idea of determining a position of a microphone so as to correspond to the oral cavity of an operator. In the usual way, the former is generally used because while an output of the loudspeaker can be specifically determined based on the performance of the loudspeaker and the setting for the mobile telephone, a sound picked up with the microphone can be freely adjusted by a loud voice of an operator. Thus, it is rare that the microphone is located in a position appropriately facing the oral cavity of an operator, and hence it is more likely that the microphone is located considerably apart from the oral cavity of an operator.

This tendency becomes more remarkable due to miniaturization of the mobile telephones. In a so-called candy bar type (straight type) miniature mobile telephone which comes into wide use in every corner of Europe and Asia, there are many ones in each of which the total length of the mobile telephone is shorter than a distance between the ear and the oral cavity of an operator.

If enhancement of sound collecting performance of the microphone is intended to be simply attained, then it is conceivable to use a more expensive microphone having higher performance. However, many inventions have been made in addition thereto. For example, it is described in JP 07-131849 A that sound holes are formed in a rear surface of a chassis of a mobile telephone to enhance the sound collecting performance.

In addition, in a flip type mobile telephone described in JP 08-097895 A, it is disclosed that a microphone is provided in a position where the microphone is exposed even in a state of closing a flip in a flip mounting section of the mobile telephone. A cavity within the flip of the mobile phone is defined, because of preventing the sound collecting performance from lowering even when the flip is opened.

In addition thereto, there is known a mobile telephone 1, as shown in FIG. 5, in which a slit 11 extends from sound holes 12 to the outside of a chassis.

However, when the sound holes are formed in the rear surface of the chassis as described in JP 07-131849 A, the light inundation is hard to avoid during rainfall or sweating. By one accident, the mobile telephone may not suddenly become unusable. However, it is also supposed that the operation of a part of functions of the mobile telephone, for example Photo function, become unusable by the long-term use in an abnormality.

In addition, as in the invention described in JP 08-097895 A, employment of a cavity structure for a movable section does not cause any of problems especially in the flip type mobile telephone that has no internal function in the 'flip'.

However, this becomes a factor of reducing a design freedom for arrangement of components or parts in the folding type mobile telephone that include the various devices in both chassis.

Also, when the slit 11 from the sound holes 12 is led out toward the outside of the chassis as shown in FIG. 5, there is also a possibility of inundation through the slit 11.

SUMMARY OF THE INVENTION

In the light of the above-mentioned problems, it is accordingly an object of the present invention to provide a mobile telephone which is capable of ensuring a sound collecting performance without providing a voice transmission path in an outward surface of a chassis or in the inside of the chassis, and a sound introducing method for the mobile telephone.

A mobile telephone according to the present invention includes: a chassis having a microphone and a manipulation section; a sound hole for voice transmission or sound collection provided near the manipulation section; and slits provided in peripheries of the manipulation section and the sound hole. In the mobile telephone, the manipulation section may include a numeric keypad for input of a telephone number, a power supply key, four-direction keys, or a shortcut key.

A mobile telephone according to the present invention includes: a chassis having a microphone and a decorative mold; a sound hole for voice transmission or sound collection provided near the decorative mold; and slits provided in peripheries of the decorative mold and the sound hole.

Note that as described above, the present invention can be applied to a codeless telephone as well as a mobile telephone, a personal handyphone system (PHS), and an IP telephone.

DETAILED DESCRIPTION OF THE PREFERRED EMBODIMENTS

Preferred embodiments of a sound hole construction for a microphone of a mobile telephone according to the present invention will hereinafter be described in detail with reference to the accompanying drawings.

First Embodiment

Figure 1:
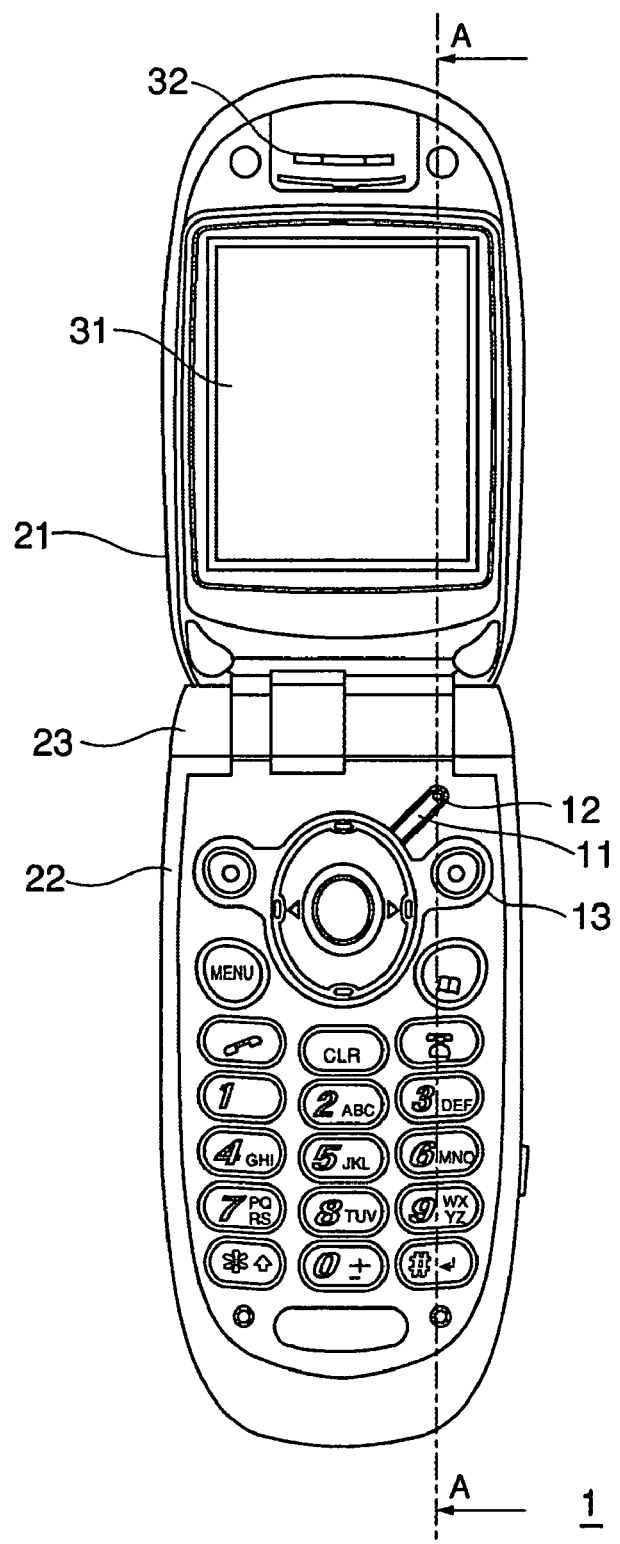
FIG. 1 is a front view of a folding type mobile telephone in an open state according to a first embodiment of the present invention.

FIG. 1 is a front view of a folding type mobile telephone in an open state of a chassis according to a first embodiment of the present invention.

A folding type mobile telephone 1 according to this embodiment has a feature that a sound hole 12 is provided in the vicinity of a hinge portion 23 of a second chassis 22.

The folding type mobile telephone 1 of the present invention adopts a construction in which a first chassis 21 and the second chassis 22 are coupled to each other through the hinge portion 23. The first chassis 21 is provided with a display section 31 and a loudspeaker 32. The second chassis 22 is provided with the sound hole 12, a special manipulation section 13 and a main manipulation section 14 (refer to FIGS. 2 and 3). Slits (grooves) 11 are formed in the peripheries of the sound hole 12 and the special manipulation section 13 on a surface of the second chassis 22. In addition, a microphone 2 is provided inside the second chassis 22. The microphone 2 picks up a voice of an operator through the sound hole 12 to convert the voice into an electrical signal, thereby transmitting the resultant electrical signal.

It should be noted that the present invention relates to a construction of the chassis of the mobile telephone. Thus, a circuit configuration and its block diagram of the mobile telephone are omitted here for the sake of simplicity.

The loudspeaker 32 generates a ringing upon reception of an incoming call, and reproduces a voice of the other party during telephonic communication.

An operator inputs a telephone number of the other party by manipulating the main manipulation section 14 provided in the second chassis 22 to start telephonic communication with the other party. In addition, the operator can receive an incoming call from the other party to start the telephonic communication with the other party by depressing a predetermined key of the main manipulation section 14.

The slits 11 are formed in the vicinities of the sound hole 12 and the special manipulation section 13 on the surface of the second chassis 22 of this embodiment. Note that in the figure, no slit 11 is formed in the periphery of the main manipulation section 14. However, the slits 11 may be formed so as to extend up to the main manipulation section 14 in terms of implementation of the present invention.

The width and depth of each slit 11 have to be designed in correspondence to constructions of devices provided inside the second chassis 22.

In addition, when the depth of each slit 11 is large, a voice transmission path is ensured when the operator presses his/her face against the front surface of the second chassis 22. On the other hand, when each slit 11 is wide, there is a high possibility that the slits 11 are filled up when the operator presses his/her face against the front surface of the second chassis 22. Thus, since the effect of ensuring the voice transmission path is reduced in such a case, the width of each slit 11 must be carefully designed.

The sound hole 12 is a hole formed for the microphone 2 provided within the second chassis 22 to pick up a sound from the outside of the second chassis 22.

The microphone 2 is a device for picking up a voice or the like of the operator. Normally, in a state of waiting for an incoming call (standby state), the microphone 2 is not operated. However, when the operation state of the folding type mobile telephone 1 is put into a telephonic communication state based on an originating call or an incoming call, an electric power is supplied to the microphone 2. The present invention is directed to a situation during telephonic communication and especially does not limit an operation of the microphone 2 before telephonic communication with the other party to any specific one.

The special manipulation section 13 includes so-called four-direction keys for selection of menu items and the various shortcut keys (e.g., a key enabling an operator to jump to a Web browser or a mailer with clicking one button). Thus, the special manipulation section 13 also includes special keys or the like which telecommunications carriers and makers allocate.

On the other hand, it is supposed that the main manipulation section 14 includes keys such as a so-called numeric keypad, a # key, a * key, a power supply key and a call originating key which are essential to a call and telephonic communication using the mobile telephone.

Figure 2:
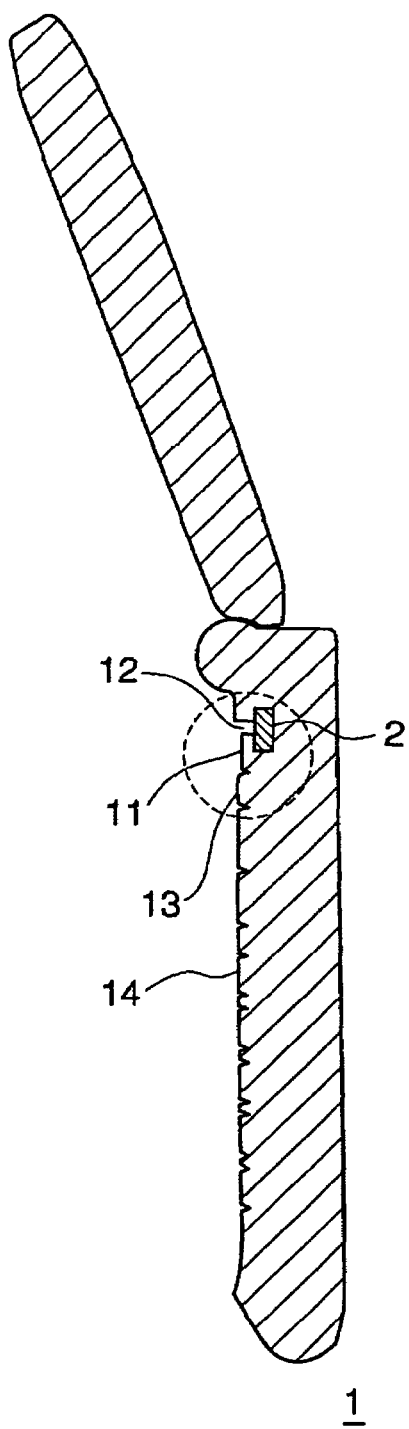
FIG. 2 is a cross-sectional view taken along the line A-A of FIG. 1.
Figure 3:
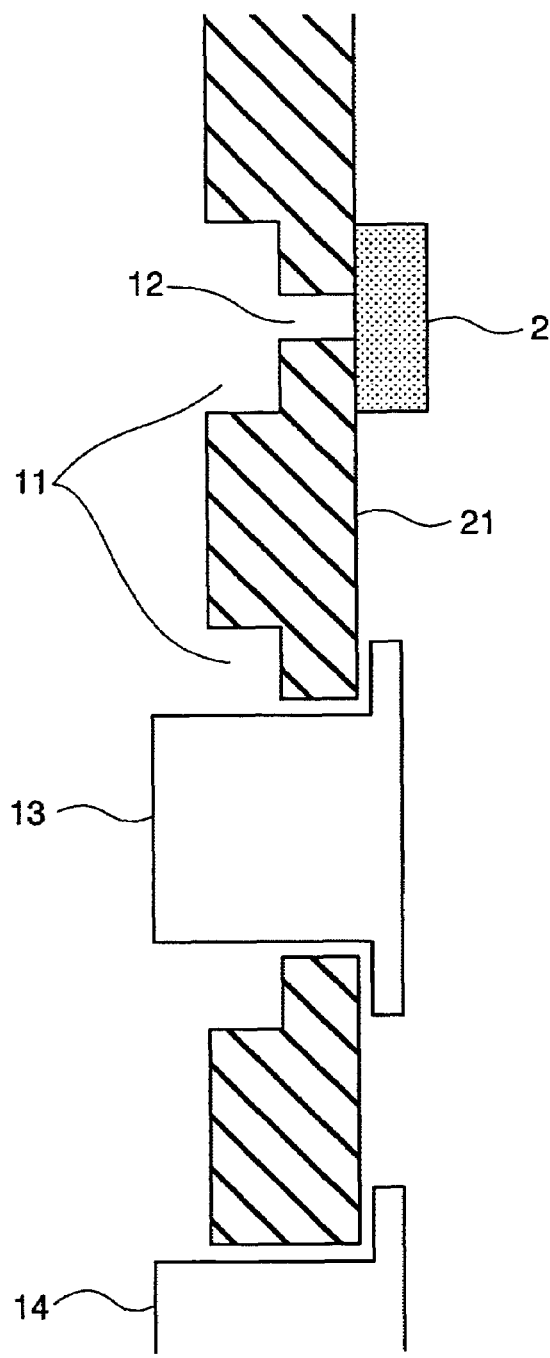
FIG. 3 is an enlarged cross-sectional view showing the periphery of a sound hole in the folding type mobile telephone according to the first embodiment of the present invention.

FIG. 2 is a cross-sectional view taken along the line A-A of FIG. 1. Note that since in the present invention, a construction of the second chassis 22 in the periphery of the microphone 2 is important, only this construction is shown, and other constituent elements such as an internal mounting board are suitably omitted here for the sake of simplicity. In addition, FIG. 3 is an enlarged cross-sectional view of a portion surrounded by the broken line in FIG. 2. In FIG. 3 as well, any of constituent elements such as a key sheet which is essential to the actual mobile telephone, but are unnecessary for the description of the present invention is omitted in illustration for the sake of simplicity.

The second chassis 22 is provided with the microphone 2, and the sound hole 12 serves as the voice transmission path through which a voice of the operator is to be transmitted to the microphone 2. Then, the slits 11 are formed in the peripheries of the sound hole 12 and the special manipulation section 13.

In the light of the foregoing structure, the effects of the present invention will hereinafter be described.

When the operator becomes hard to hear a voice of the other party during the telephonic communication, he/she necessarily brings his/her ear to the loudspeaker 32. As a result, a face of the operator is pressed against the front surface of the second chassis 22 of the folding type mobile telephone 1. In case of a general mobile telephone including a chassis having no slit, when the operator's face is pressed against a front surface of the chassis of the mobile telephone, his/her face is tightly pressed against the front surface of the mobile telephone. As a result, while a voice from a loudspeaker becomes easy to hear, the operator's face fills up a sound hole. This results in lowered sound collecting performance.

On the other hand, in the case of the folding type mobile telephone 1 including the second chassis 22 having the slits 11 formed therein of the present invention, even when the operator tightly presses his/her face against the front surface of the second chassis 22 of the folding type mobile telephone 1, the voice transmission path corresponding to the slits 11 is effectively ensured. As a result, the reduction of the sound collecting performance of the sound hole 12 can be prevented or can be minimized.

Note that while in this embodiment, the description has been given with respect to the specific case where the sound hole 12 is provided in the vicinity of the special manipulation section 13, the same effects as those in this embodiment can be obtained even when the sound hole 12 is provided in the vicinity of the main manipulation section 14. In this case, the slits 11 are also provided in the vicinities of the sound hole 12 and the main manipulation section 14. In addition, when a part of the slits 11 is wide, a projection may be provided to ensure the voice transmission path to that extent. Moreover, the slits 11 may be made to extend in two or more directions. In this case, since even when one path of the slits is filled up, the other paths of the slits are not filled up, the voice transmission path can be ensured.

Second Embodiment

In the first embodiment, the description has been given with respect to the case where the sound hole 12 is provided in the vicinity of the special manipulation section 13. However, the sound hole 12 is not necessarily provided close to the special manipulation section 13. In a second embodiment of the present invention, it is supposed that the sound hole 12 is provided in the vicinity of a mold having a decorative effect.

Figure 4:
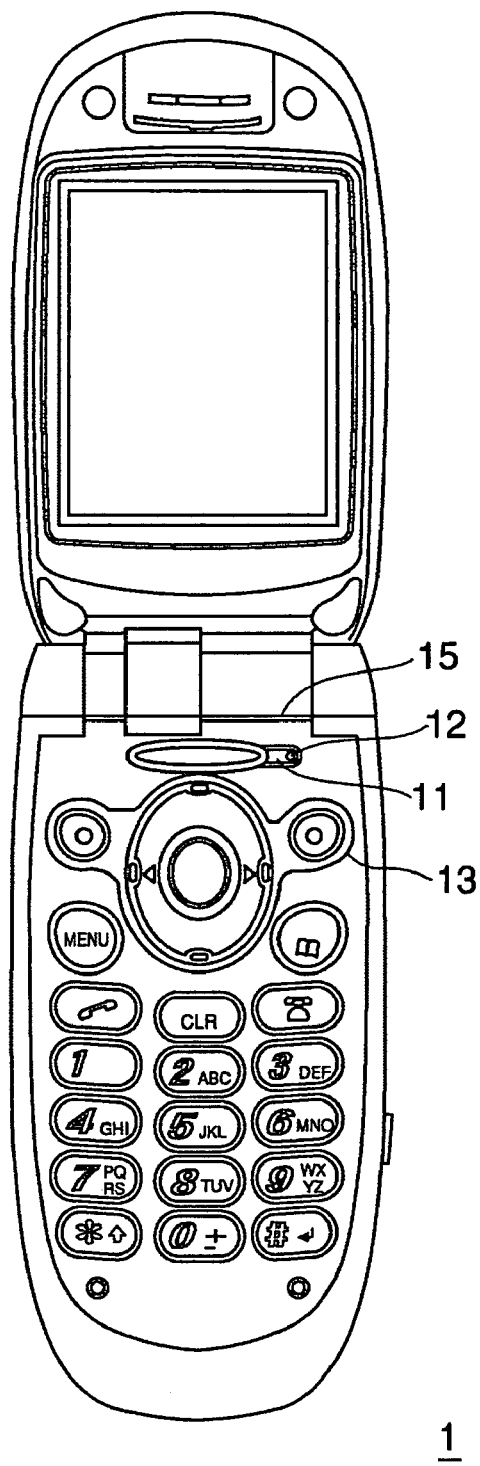
FIG. 4 is a front view of a folding type mobile telephone in an open state according to a second embodiment of the present invention.
Figure 5:
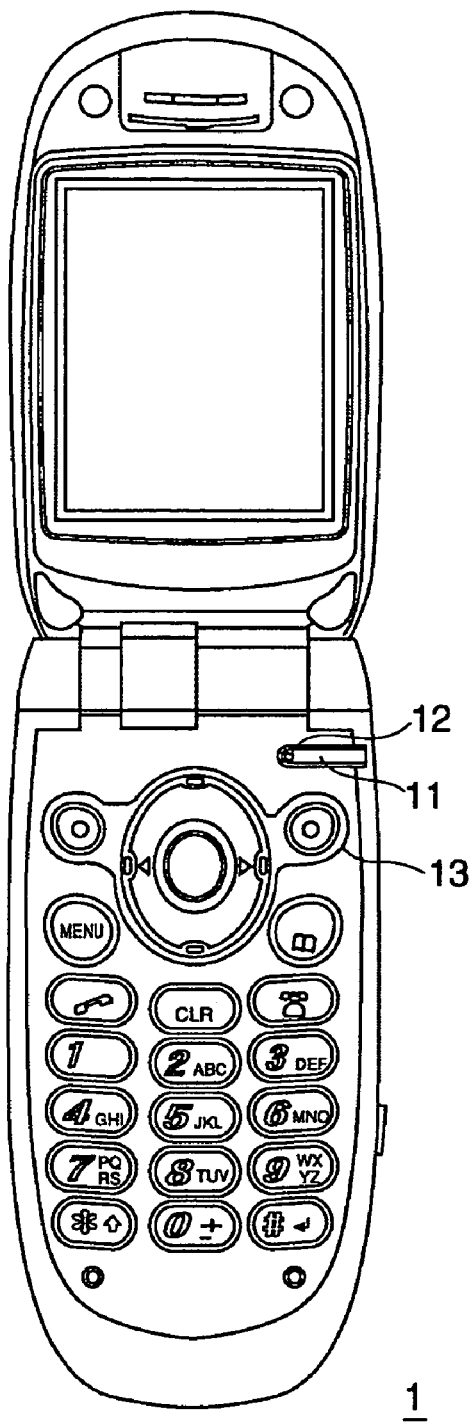
FIG. 5 is a front view of a conventional folding type mobile telephone in an open state.

FIG. 4 is a front view of a folding type mobile telephone in an open state of a chassis according to the second embodiment of the present invention. Referring to FIG. 4, the sound hole 12 is provided in the vicinity of an emblem 15 provided on the front surface of the second chassis 22. The emblem 15 shows a model of mobile telephone and a pet name thereof, and a name of a telecommunications carrier or a mobile telephone maker. The emblem 15 has no particular function at all. In this embodiment, the sound hole 12 is formed in the vicinity of the emblem 15, and then the same effects as those of the first embodiment, are obtained by forming the slits 11 in the peripheries of the sound hole 12 and the emblem 15.

It is to be understood that the present invention is not intended to be limited to the case where the slit 11 is formed only in the periphery of the emblem 15. For example, the slits 11 may be provided in the peripheries of both the emblem 15 and the special manipulation section 13.

According to the folding type mobile telephone to which the present invention is applied, even when an operator presses his/her face against the front surface of the second chassis during the telephonic communication with the other party, the voice transmission path is ensured through the slits formed in the peripheries of the manipulation section and the microphone. As a result, the sound collecting ability of the microphone can be ensured to a certain extent or more, and hence a voice of an operator can be surely transmitted to the other party side.

What is claimed is:

1. A mobile telephone, comprising:
   a chassis having a microphone, a manipulation section, a decorative mold, and a sound hole for voice transmission or sound collection provided near the decorative mold; and
   slits provided in peripheries of the decorative mold and the sound hole,
   said slits further including a slit which links the sound hole and the decorative mold to ensure voice transmission path,
   wherein said manipulation section includes a plurality of keys, wherein a gap is provided in said chassis around at least one of said plurality of keys such that an opening to an interior of said chassis exists by way of said gap, and
   wherein said slit which links the sound hole and the manipulation section provides for a voice transmission path to said microphone by way of said gap, said microphone being disposed within the interior of said chassis with said sound hole being provided above said microphone.

2. A mobile telephone according to claim 1, wherein the chassis comprises:
   a first chassis section that includes a display; and
   a second chassis section that includes the microphone, the decorative mold, and the sound hole; and
   a pivoting section provided between the first and second chassis sections, the pivoting section providing for the first and second chassis sections to be pivoted away from each other to allow a user to operate the mobile telephone, and providing for the first and second chassis sections to be pivoted towards each other so as to have respective inner surfaces of the first and second chassis sections contact each other in order to protect the mobile telephone when not in use,
   wherein the slits are only provided on the inner surface of the second chassis that faces the inner surface of the first chassis when the first and second chassis sections are pivoted towards each other.

* * * * *